J. E. POLLARD.

Ornamented Felt Skirts and Fabrics.

No. 5,834.

Reissued April 14, 1874.

Witnesses.

L. N. Mellel

E. Pfeiffer

Inventor.

James E. Pollard

UNITED STATES PATENT OFFICE.

JAMES E. POLLARD, OF NORFOLK, MASSACHUSETTS, ASSIGNOR TO THE ELLIOTT FELTING-MILLS.

IMPROVEMENT IN ORNAMENTED FELT SKIRTS AND FABRICS.

Specification forming part of Letters Patent No. 147,166, dated February 3, 1874; reissue No. 5,834, dated April 14, 1874; application filed March 21, 1874.

*To all whom it may concern:*

Be it known that I, JAMES E. POLLARD, of Norfolk, Massachusetts, have invented an Improvement in Ornamented Felt Skirts, and Felts, of which the following is a specification:

This invention consists in a felt skirt, and fabric for the same, so manufactured and figured as to resemble cassimeres and other expensive cloths.

Heretofore felt skirts have been ornamented and finished by cutting the skirt from felt cloth, sewing up all but one seam, and then putting it into an embossing-press and embossing colors upon it, and the remaining seam is then sewed up. This gives a figured border on the lower portion of the skirt.

My invention is produced by impressing upon the surface of felt figures and lines, which shall so contrast with the remainder of the surface as to produce ornamentation without coloring.

Figure 1:
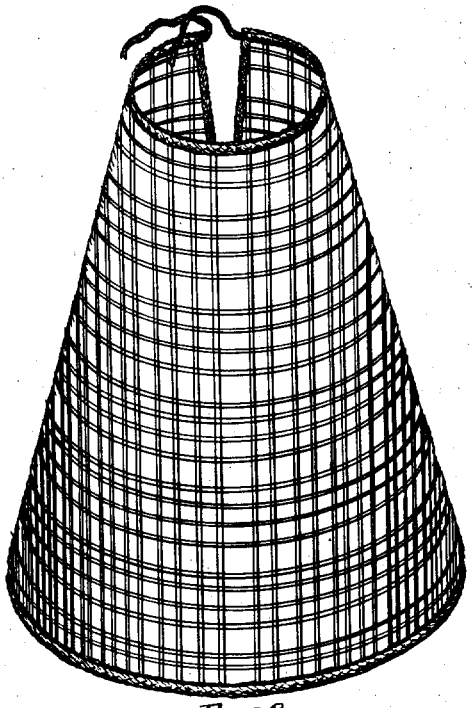
Figure 2:
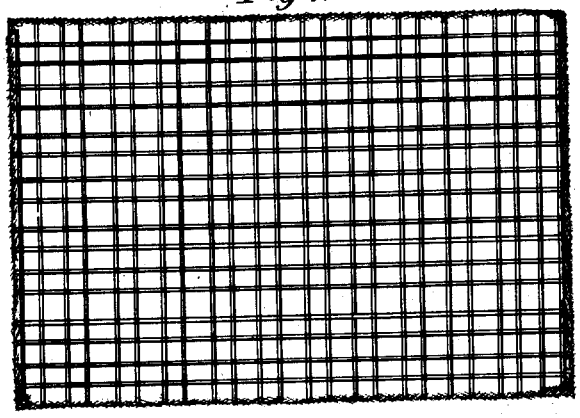

Figure 1 shows a skirt made and ornamented by this invention, and Fig. 2 a piece of felt fabric ornamented in the same manner.

In carrying out my invention I take felt cloth, as made by any of the known methods, and dampen or moisten it, and then pass it between heated calender-rolls, one of which, at least, is engraved with the design to be impressed upon the surface and fixed upon the cloth. The rolls may be heated by gas, and should be about 250° to 275° Fahrenheit, or about the temperature given to a flat-iron or goose for surfacing cloths.

The felt cloth is run through the machine at such a rate as will fix the design upon the felt. This operation also serves to compact and harden the felt, and gives a firm surface to it. The figure thus impressed and fixed upon the felt skirt or fabric may be made to imitate check, stripe, or other ornamental figure, as desired. The ornamenting and finishing may be done in the piece, or on each skirt separately.

Instead of heated calender-rolls, heated plates may be used to produce the same result; but the heated rolls are both more economical and more effective.

When I desire to impart greater boldness and permanence to the figure, I apply a gum or sizing to the fabric before passing it through the calenders.

One of the results which follow from dampening or moistening surfaced felt and then passing it through the rolls, as above described, is, that the lines and figures impressed upon the surface are smooth and lustrous, while the rest of the surface is lusterless, loose, and more or less spongy, and hence seems to have a different color from these depressed lines and figures, and the effect of these parts in contrast with each other is closely imitative of cassimeres and other figured cloths. This result may be obtained also by omitting the finishing or surfacing to which felt is ordinarily subjected, and passing the felt through the heated engraved rolls, as above described, instead, and also by passing through these rolls felt partially or lightly finished, or otherwise so treated that the portion of the surface not impressed by the rolls will be, comparatively, to the lines and figures impressed by them, loose and spongy, and less lustrous or lusterless, the above-described contrast being the essential requisite.

I am aware that woven fabrics of various kinds have been embossed by means of heated calenders, rolls, or plates, and also that felted goods have been ornamented by printing various designs in pigment or flock colors upon them. Such process, however, I do not claim; but I am not aware that felt skirts or fabrics for making the same have ever been embossed, ornamented, and treated in the manner described by me to imitate cassimeres or other expensive cloths; and, accordingly,

What I claim as my invention, and wish to secure by Letters Patent, is—

As a new article of manufacture, a skirt made of felt, or a felt fabric, having its surface or surfaces impressed, embossed, and ornamented with any desired design, and made to resemble cassimeres and other expensive woven cloths and fabrics, in the manner hereinbefore described, by means of heated engraved rollers, plates, or equivalent devices, substantially as for the purposes set forth.

JAMES E. POLLARD.

Witnesses:
ROBERT THOMAS,
E. F. WILDER.